(12) United States Patent
Klühspies et al.

(10) Patent No.: US 7,284,793 B2
(45) Date of Patent: Oct. 23, 2007

(54) EXPANDABLE CRASH-ACTIVE NECK REST

(75) Inventors: Ronald Klühspies, Ochsenfurt (DE); Gerd Fischer, Weikersheim (DE); Carsten Albracht, Iserlohn (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 272 days.

(21) Appl. No.: 11/086,350

(22) Filed: Mar. 23, 2005

(65) Prior Publication Data

US 2005/0225144 A1    Oct. 13, 2005

(30) Foreign Application Priority Data

Apr. 10, 2004    (DE)    ................. 10 2004 017 688

(51) Int. Cl.
*A47C 31/00*    (2006.01)
*A47C 7/36*     (2006.01)
*B60N 2/48*     (2006.01)
*B60R 22/28*    (2006.01)

(52) U.S. Cl. .................. 297/216.12; 297/391
(58) Field of Classification Search .......... 297/216.12, 297/391, 408
See application file for complete search history.

(56) References Cited

U.S. PATENT DOCUMENTS

| 4,657,304 | A | * | 4/1987 | Heesch et al. ............. 297/391 |
| 4,762,367 | A | * | 8/1988 | Denton ..................... 297/409 |
| 4,778,218 | A | * | 10/1988 | Suman ..................... 297/391 |
| 5,020,855 | A | * | 6/1991 | Lindberg et al. ............ 297/391 |
| 6,082,817 | A | * | 7/2000 | Muller .................. 297/216.12 |
| 6,213,548 | B1 | * | 4/2001 | Van Wynsberghe et al. .. 297/216.12 |
| 6,623,073 | B2 | * | 9/2003 | Schafer et al. ......... 297/216.12 |
| 6,767,064 | B2 | * | 7/2004 | Veine et al. ................ 297/391 |

FOREIGN PATENT DOCUMENTS

| DE | 199 51 966 | 5/2001 |
| DE | 199 61 617 | 7/2001 |
| DE | 101 42 625 | 4/2003 |
| DE | 102 08 620 | 7/2003 |

* cited by examiner

*Primary Examiner*—David Dunn
*Assistant Examiner*—Tania Abraham
(74) *Attorney, Agent, or Firm*—Lowe, Hauptman, Ham & Berner, LLP

(57) ABSTRACT

A neck rest for a seat of an automobile has a neck rest body which includes a neck rest cushion and at least two neck rest rods connected with the neck rest body, the neck rest rods being accommodated in the back rest of the seat. Each of the neck rest rod has a support portion attached thereto. The neck rest body includes a housing which has a front wall and a rear wall, the cushion being attached to an outer side of the front wall and the rear wall, with the support portion being located in the housing between the front and the rear walls. The housing is moveable between a basic position and an extended position.

19 Claims, 2 Drawing Sheets

EXPANDABLE CRASH-ACTIVE NECK REST

RELATED APPLICATIONS

The present application is based on, and claims priority from, German Application No. 10 2004 017 688.4, filed Apr. 10, 2004, the disclosure of which is hereby incorporated by reference herein in its entirety.

FIELD OF THE INVENTION

The invention relates to a neck rest for seats of automobiles according to claim 1.

BACKGROUND OF THE INVENTION

DE 199 61 617 A1; DE 199 51 966 A1 or DE 101 42 625 A1 have made known a neck rest which has a strut member which can be displaced towards the front on the seat user's head, and an impact member actuating the strut member. When there is an impact onto the rear end of the vehicle the impact member will be actuated and the strut member is displaced towards the front. The strut member is supported on the cushion holder via pivoting arms. In DE 199 51 966 A1, the strut member forms part of the neck rest cushion which consists of two components which are connected to each other via joints. The impact member can interact with the strut member via a pull rope and can be in communication with a release element.

DE 102 08 620 describes a neck rest for the seats of automobiles which has a fixed support portion and a second support portion for a movable cushion component which is movably supported in the first support portion. The second support portion is pivotally supported about a lower horizontal axis in the first support portion and an actuation device is defined by a spring which biases the second support portion. A controllable locking device maintains the second support portion in the retracted position on the first support portion. A third support portion is supported to be displaced on the second support portion between a lower and an upper position. The third support portion is biased by a second spring towards the upper position. A second controllable locking device maintains the third support portion in the lower position with the second locking device being released when the second support portion has reached a predetermined pivoting angle. This design is intended to help in achieving an optimum load absorption with no risk for the seated person to be injured during a rear-end collision.

Neck rests of this type are also referred to as crash-active neck rests. Their characteristic feature is that a seat user's head which will bounce back during a crash moves through a distance which is as short as possible until it hits against the neck rest. This distance possibly is relatively long when a passive neck rest is used and there is a risk for the head not to be supported at the proper point so that backbone lesions cannot be ruled out.

The disadvantage of the extendable neck rests which are known is that they comprise multiple elements. This involves relative large expenditure for their manufacture, specifically for its cushion. Moreover, their appearance possibly is not very pleasing because there is a circumferential gap between the adjacent components of the known crash-active neck rest.

SUMMARY OF THE INVENTION

It is the object of the invention to provide a neck rest for automobiles which, while having crash active properties, is of a simpler construction and allows for a cushion and a covering as for conventional standard neck rests.

The object is achieved by the features of claim 1.

In the inventive neck rest, a support portion is fixedly attached to the two neck rest rods. The neck rest body has a shroud-like housing which has a front wall and a rear wall. A cushion can be mounted on the front side of the front wall. The housing may altogether be provided with a single-piece covering. The support portion is located within the housing between the front and rear walls. The shroud-like housing is movably supported between a rear basic position in which the support portion is near or adjacent to the inner side of the front wall and an extended position in which the support portion is remote from the front wall. A linkage is hinged between the support portion or the neck rest rods and the front wall, respectively, and a spring arrangement biases the linkage or housing, respectively, towards the extended position. A releasable locking device locks the housing or linkage, respectively, in the basic position and a releasing device, upon its actuation, releases the locking device whereby the housing is moved from the basic position to the extended position. Strut means support the linkage or the housing in its extended position on an abutment, which prevents the neck rest body, on striking the cushion, from being moved back towards the basic position.

Upon a release of the locking device, the neck rest body is rapidly advanced towards the seat user's head wherein the design of the linkage, according to an aspect of the invention, is such that the neck rest body is moved upwards at the same time, which causes the moving component to obliquely point upwards. The locking device is released via appropriate means detailed reference to which will not be made and which are known already from the previously described state of the art.

The fact that the neck rest body has a housing which is more or less closed circumferentially makes it commonly possible to provide it with a cushion and a cloth covering. When the body is released and is displaced to the extended position from the basic position the body will be moved as a whole rather than individual components thereof are moved as is the case in the state of the art. This allows to give the neck rest body a relatively simple construction and, as was mentioned before, a particularly simple covering as is used in conventional neck rests.

The shroud-like housing of the neck rest body preferably is open in the downward direction so that it can be slid over the neck rest rods and the support therebetween. Various designs of a linkage can be imagined and are possible. To this end, an aspect of the invention provides for a scissors type linkage having a pivoting lever and a strut lever which are pivotally linked to each other between the ends. The pivoting lever has its upper end pivotally linked to the support portion or neck rest rods and has its lower end hingedly linked to the housing. The strut lever has its upper end guided approximately vertically within the housing whereas it has its lower end supported on at least one supporting surface when the neck rest body is in the extended position.

A scissors type linkage of this type needs to be biased. Therefore, an aspect of the invention provides that the pivoting lever is biased by a leaf spring towards the extended position. It further is useful to provide a biasing spring also between the two levers. In this conjunction, an aspect of the invention provides that the strut lever is biased by a coil spring towards the extended position on its pivoting axis where at least one end of the coil spring is supported on the pivoting lever. This design allows to displace the neck rest body to the extended position particularly rapidly.

For a guidance of the strut lever, an aspect of the invention provides for its upper end to have a guide rod which cooperates with a vertical elongated hole in the interior of the housing. The elongated hole is preferably located on a portion in the housing that is mounted on the inner wall, preferably the side wall of the casing. According to a further aspect of the invention, this elongated hole may have saw teeth on a hole wall which faces the front wall of the casing. If the impact of the head takes place while the neck rest is moving to the extended position at a time where the neck rest has not reached yet its final extended position the guide rod is adapted to engage a gap between adjacent saw teeth, thus defining a support for the bearing rod. The support is enhanced if the support portion, according to a further aspect of the invention, has vertically superimposed stop steps which are adapted to support the lower end of the strut lever. The saw teeth and steps can be designed such that the lower end of the strut lever is supported on one of the steps when the upper end has its guide rod positioned in a gap between adjacent saw teeth. In this manner, the neck rest body is also active as an impact-absorbing member in intermediate positions.

BRIEF DESCRIPTION OF THE DRAWING

The invention will now be described in more detail with reference to an embodiment.

DETAILED DESCRIPTION OF THE INVENTION

In FIGS. 1 through 4, two neck rest rods 10, 11 can be seen which are connected to each other via a transverse rod 12 at the upper end. The neck rest rods 10, 11 are received in appropriate receptacles in a back rest of an automobile seat which is not shown. The neck rest rods have mounted thereon a neck rest body 14 which will be described in detail below.

Figure 1:
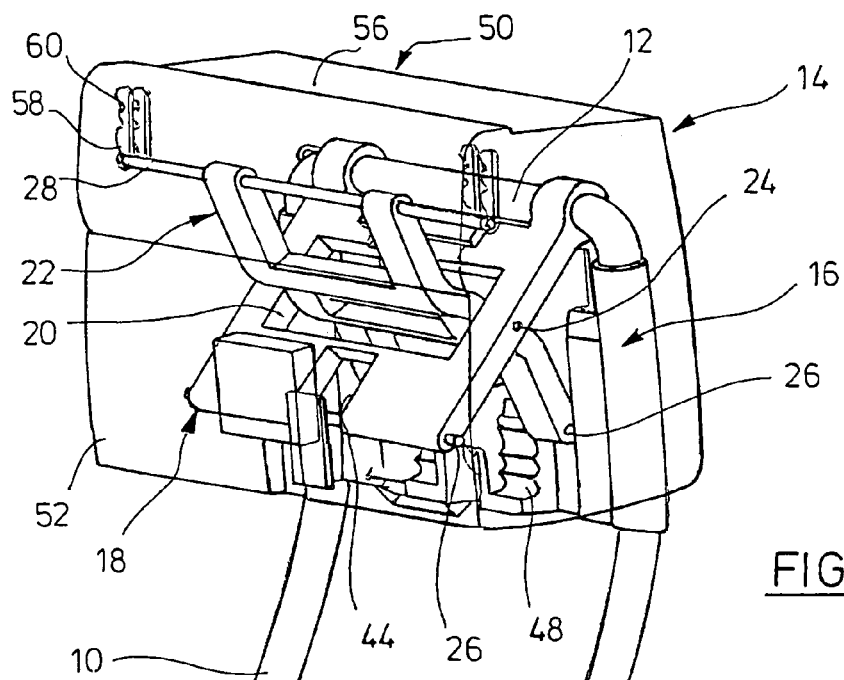
FIG. 1 shows a perspective view of a neck rest of the invention in the extended position as seen from the front side.
Figure 2:
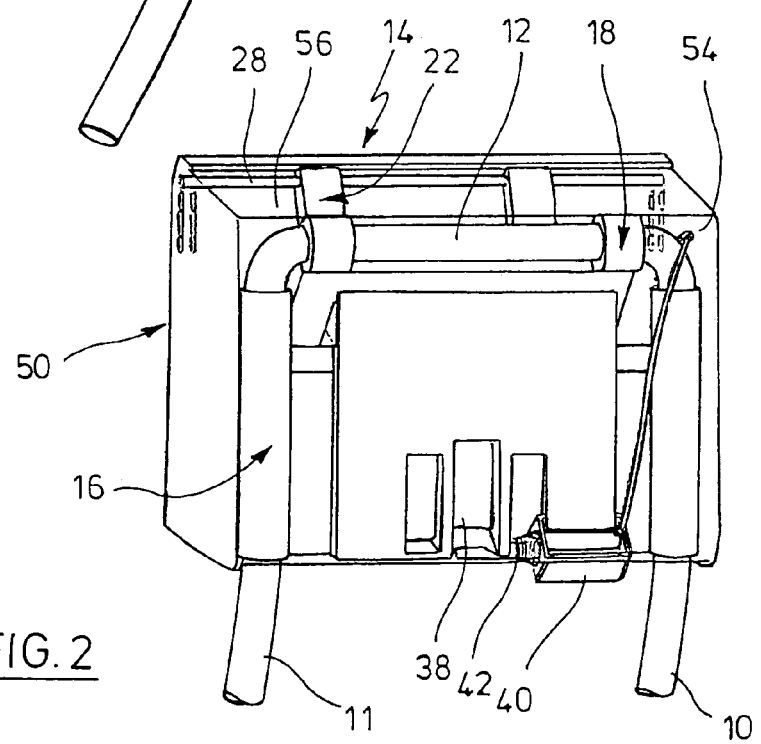
FIG. 2 shows a perspective view of a neck rest of FIG. 1 as seen from the rear side.
Figure 4:
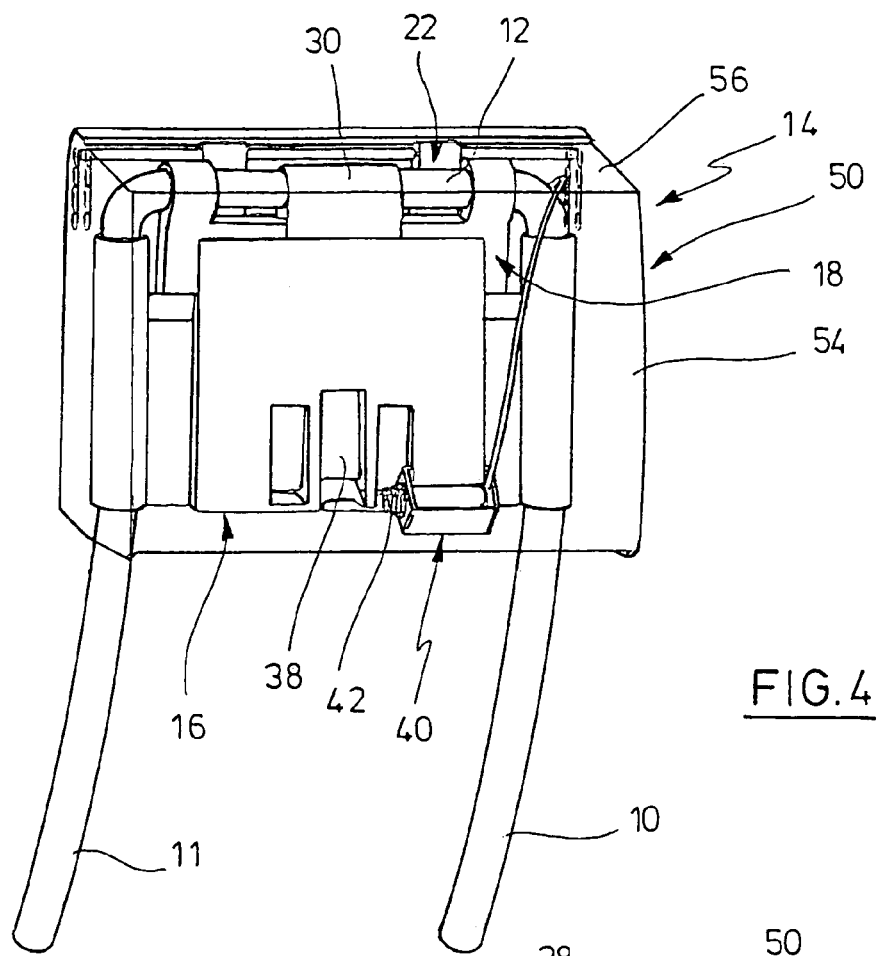
FIG. 4 shows a perspective view of a neck rest of FIG. 3 as seen from the rear side.
Figure 3:
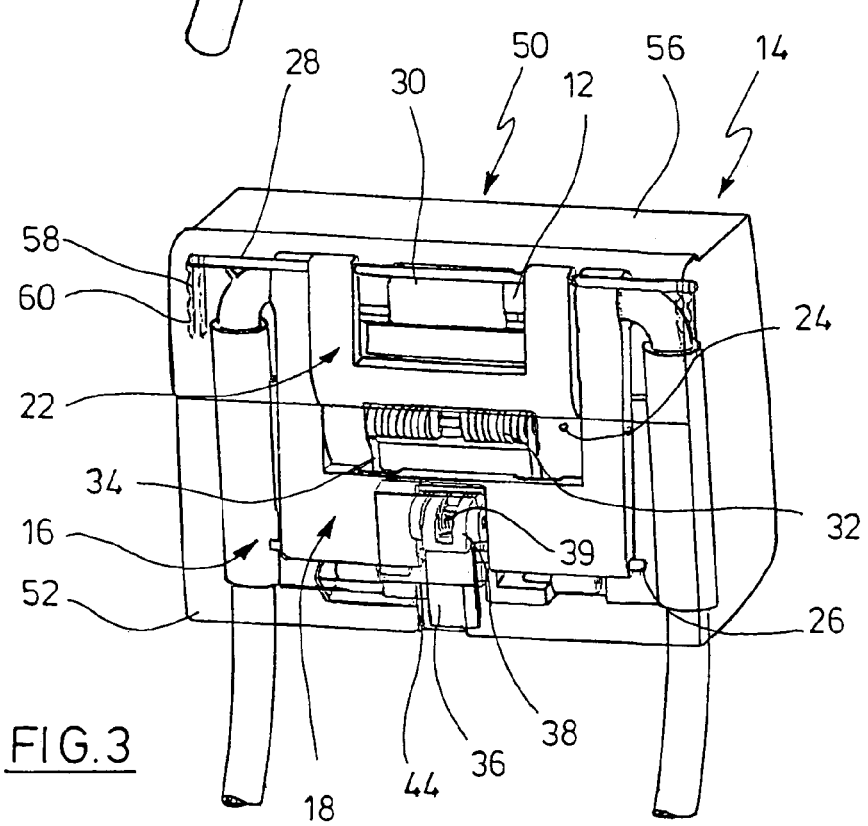
FIG. 3 shows a perspective view of a neck rest of FIG. 1 in the basic position as seen from the front side.

A plate-shaped support portion 16 is fixedly linked to the neck rest rods 10, 11 at the lateral ends and extends between these two ends below the transverse rod 12 interconnecting the rest rods 10, 11. A pivoting lever 18 is pivotally supported on the transverse rod 12, i.e. by means of two spaced bearing rings. The pivoting lever 18, which is relatively broad, has a first recess 20 (FIG. 1) and a second recess at the lower end. The recess 20 is traversed by a strut lever 22 which is pivotally supported in the middle of the recess as is outlined by the bearing pin 24 in FIGS. 1 and 3. The strut lever 22 has two parallel-spaced arms each at the upper end and lower end. The lower arms support a bearing rod 26 (FIGS. 1 and 3). The upper parallel arms support a guide rod 28. The guide rod 28 laterally extends horizontally outwards beyond the respective arms.

The pivoting lever 18 is biased by a leaf spring 30 which is mounted on the transverse rod 12, namely in the direction away from the rods 10, 11. The bearing pin 24 has disposed thereon a coil spring 32 which supports its ends 34 on the pivoting lever 18. As a result, a bias has built up between the pivoting lever 18 and strut lever 22 and tends to move apart this lever in a scissors fashion as is illustrated in FIG. 1. FIG. 1 shows the extended position of the levers 18, 22 while the basic position can be appreciated in FIG. 3.

At the lower end of the support portion, approximately in the middle, a two-armed bearing projection 36 is formed which pivotally supports a locking lever 38. The locking lever 38 can be seen from the rear side in FIGS. 2 and 4. It is biased in front of a spring 39 in a released position. It interacts with an electromagnet 40 which actuates a locking pin 42. The pin 42 is retracted in FIGS. 2 and 4, thus enabling the locking lever 38 to be freely pivoted. On the contrary, if the pin 42 is caused to travel leftwards to the locking position the locking lever 38 will be able to lock the pivoting lever 18 and strut lever 22 in the basic position shown in FIG. 3. For this purpose, the locking lever 38, which is formed like a hook, grips over a portion of the rod 26 which extends crosswise through the lower end of the pivoting lever 18 and, by doing so, is also extended across and through the recess. In the basic position, the fork-like bearing device extends through another recess 44, thereby allowing the locking lever 38 to grip behind the portion of the rod 26 facing it.

In FIG. 1, it can be appreciated that a plurality of superimposed support steps 48 are laterally formed next to the bearing projection 36 in the support portion 16. The bearing rod 26 can support itself on one of the steps 48 in various positions of the lever 22. One support is shown on the uppermost step in FIG. 1. It is understood that a step assembly which is identical to the assembly 48 is also provided on the opposite side of the bearing projection 36 for the other, lower arm of the strut lever 22.

FIGS. 1 through 4 further allow to see that a shroud-like housing 50 is slid over the described assembly from the top on the neck rest rods 10, 11. The housing has a front wall 52, a rear wall 54, a ceiling 56, and side walls which are not designated. The housing 50 is larger in width in a horizontal direction, which makes it possible for the lever assembly and the support portion 16 to bear relatively closely on the front wall 52 in the basic position of FIG. 3 whereas if the levers 18, 22 are in the extended position the rear wall 54 is relatively close to the support portion 16. The housing, which is formed from an appropriate plastic material like the remaining components, for example, with the exception of the neck rest rods 10, 11 serves for accommodating a cushion (not shown) on the front wall 52 and a covering over the remaining components as is generally common and known for neck rests. As can be recognized from FIGS. 1 through 4 the walls of the shroud 50 are shown as being transparent to make the interior clearly visible. The insides of the two side walls of the housing 50 have formed thereon elongate holes one of which is can be seen at 58 in FIGS. 1 and 3. The elongate holes 58 extend approximately vertically and are fixed in a thickened or separated portion within the housing 50. The elongate holes 58 have saw teeth 60 on the side facing the front wall 52. As further is apparent from FIGS. 1 and 3 the ends of the guide rod 28 engage the elongate holes 58 and interengage with the saw teeth 60, if required. In the basic position, the guide rod is at the upper end of the elongate hole 58 (FIG. 3) whereas the rod 28 strikes the lower end of the elongate hole 58 in the extended position The way of operation of the neck rest assembly described will be explained below. Its function consists in being moved from the basic position illustrated in FIGS. 3 and 4 to an extended position of FIGS. 1 and 2 in a "crash case". To initiate this motion, there is a member (not shown) in the automobile that provides a control command to the electromagnet 40 in the case of a tailgating collision. The pin 42 is extended in the basic position and locks the locking lever 38 in place (which is not shown in FIG. 4, however). When the pin 42 is retracted by the electromagnet 40 to the position shown in FIG. 4 the locking lever 38 is released and the leaf spring 30 and the coil spring 32 move the levers 18, 22 apart. The pivoting lever 18 is swung away from the support portion 16 and the strut lever 22 is swung away clockwise relative to the pivoting lever 18, to the positions shown in FIG. 1. At this stage, the guide rod 28 grips under the last saw tooth of the elongate hole 58 and the bearing rod 26 rests on the uppermost step of the step assembly 48. Now, when a impact is exerted on the rear wall 54 the shroud 50 and, hence, the neck rest body 14 will remain in the position illustrated in FIGS. 1 and 2 because the pivoting lever 18 and the strut lever 22 are prevented from moving to the basic position. The pivoting lever 18 supports itself on the strut lever 22 and this one does on one of the steps of the step assembly 48. The guide rod 28 prevents the bearing rod 26 from sliding off the steps 48 by causing the latter rod to get locked by the lowermost saw tooth.

If the head strikes the front side of the neck rest body 14 at an earlier time than the extended position of FIG. 1 is reached the neck rest body can be supported nevertheless in an intermediate position between the basic and extended positions since the bearing pins are supported on one of the lower steps 48 and the guide rod 28 engages a gap between the upper saw teeth 60.

The shift described for the shroud-like housing 50 is not only performed horizontally, but also has a vertical component. This is the way the neck rest cushion (not shown) is moved towards the back of seat user's head if the user shoots backwards because the vehicle experiences a crash.

Finally, it should be added that the projecting ends of the rod 26 are received in appropriate bearing openings which are provided on the side walls in the interior of the shroud-like housing 50, but are not shown here. In this manner, the pivoting lever 18 is hinged to the shroud-like housing 50.

The invention claimed is:

1. A neck rest for a seat of an automobile, said neck rest comprising:
   a neck rest body which includes a neck rest cushion; and
   at least two neck rest rods connected with the neck rest body, the neck rest rods adapted to be accommodated in a back rest of the seat and each of said neck rest rods having a support portion attached thereto, wherein
   the neck rest body comprises
      a housing which has a front wall and a rear wall, the cushion being attached to a front side of the front wall and the rear wall, the support portion being located in the housing between the front and rear walls, the housing being moveable between a basic position wherein the support portion is adjacent to an inner side of the front wall, and an extended position wherein the support portion is remote from the front wall,
      a linkage adapted to link the support portion or the neck rest rods, respectively, and the front wall,
      a spring arrangement biasing the linkage or the housing, respectively, towards the extended position,
      a releasable locking element adapted to lock the housing or the linkage, respectively, in the basic position,
      a releasing element which upon actuation releases the locking element whereby the housing is moved from the basic position to the extended position,
      a releasable strut element which forms an abutment for the housing and the linkage in the extended position; and
   the linkage comprises a pivoting lever and a strut lever which are linked to each other between their upper and lower ends, the pivoting lever is linked to the support portion or the neck rest rods, respectively, with its upper end and to the housing with its lower end, the strut lever with its upper end supports the housing vertically and with its lower end is supported on a supporting surface when the housing is in the extended position;
   the pivoting lever at its lower end has a bearing rod, said bearing rod having ends protruding beyond the pivoting lever, the ends being accommodated by bearing openings of the housing; and
   the bearing rod extends over a central recess of the pivoting lever, and a locking lever pivotally supported by the support portion cooperating with the bearing rod in the recess.

2. The neck rest of claim 1, wherein the support portion includes a support plate between the neck rest rods.

3. The neck rest of claim 1, wherein the pivoting lever is biased by a leaf spring towards the extended position.

4. The neck rest of claim 3, wherein the strut lever is biased towards the extended position by a crew spring on a pivoting axis of said strut lever.

5. The neck rest of claim 1, wherein the pivoting lever is linked to a guide rod of the neck rest rod.

6. The neck rest of claim 1, wherein the locking lever is maintained in the locking position by a pin of an electromagnet mounted to the support portion.

7. The neck rest of claim 1, wherein the upper end of the strut lever has a guide rod which cooperates with an elongated hole in an interior of the housing, and wherein a plurality of saw teeth in the elongated hole and a plurality of support steps are arranged relative to each other such that the strut lever engages one support step when the guide rod is in a space between adjacent saw teeth.

8. A neck rest for a seat of an automobile, said neck rest comprising:
   a neck rest body having a neck rest cushion; and
   at least two neck rest rods, said neck rest rods adapted to be connected to the neck rest body and said each neck rest rod comprising a support portion, wherein
   the neck rest body comprises a housing having a front wall and a rear wall, the cushion being attached to an outer side of the front wall and the rear wall;
   said support portions being located in the housing between the front and the rear walls;
   the housing being moveable between a basic position wherein the support portion is adjacent to an inner side of the front wall, and an extended position wherein the support portion is remote from the front wall;
   a linkage linking the support portion or the neck rest rods and the front wall, respectively;
   a spring arrangement biasing the linkage or the housing, respectively, towards the extended position;
   a releasable locking element adapted to lock the housing or the linkage, respectively, in the basic position, a releasing element which upon actuation is adapted to release the locking element thereby moving the housing from the basic position to the extended position;

a releasable strut element adapted to form an abutment for the housing and the linkage in the extended position, wherein the linkage comprises a pivoting lever and a strut lever, said pivoting lever and strut lever linked to each other between their upper and lower ends, the pivoting lever is linked to the support portion or the neck rest rods, respectively, with its upper end and linked to the housing with its lower end, the strut lever with its upper end supports the housing vertically and its lower end is supported on a supporting surface when the housing is in the extended position; and the upper end of the strut lever has a guide rod which cooperates with an elongated hole in an interior of the housing.

9. The neck rest of claim 8, wherein the housing is open at a lower end thereof and is moveable around the support portion and the upper ends of the rods.

10. The neck rest of claim 8, wherein the linkage is formed such that the housing upon its movement to the extended position is also moved upwardly.

11. The neck rest of claim 8, wherein the strut lever is biased towards the extended position by a crew spring on a pivoting axis of said strut lever.

12. The neck rest of claim 8, wherein the pivoting lever at the lower end has a horizontal bearing rod, the ends thereof protruding beyond the pivoting lever and, being accommodated by bearing openings of the housing.

13. The neck rest of claim 8, wherein the support portion has a plurality of vertically arranged stop steps adapted to support the lower end of the strut lever in an intermediate position between the basic and the extended positions.

14. The neck rest of claim 13, wherein a wall of the elongated hole facing the front wall is shaped as saw teeth.

15. The neck rest of claim 14, wherein the saw teeth in the elongated hole and the stop steps are arranged relative to each other such that the strut lever engages one stop step when the guide rod is in a space between adjacent saw teeth.

16. The neck rest of claim 15, wherein the guide rod is manually adjustable to engage a desired one of the saw teeth according to a user's requirement.

17. The neck rest of claim 8, wherein the support portion includes a support plate between the neck rest rods.

18. A neck rest for a seat of an automobile, said neck rest comprising:

a neck rest body having a neck rest cushion; and at least two neck rest rods, said neck rest rods adapted to be connected to the neck rest body and said each neck rest rod comprising a support portion, wherein the neck rest body comprises a housing having a front wall and a rear wall, the cushion being attached to an outer side of the front wall and the rear wall;

said support portions being located in the housing between the front and the rear walls;

the housing being moveable between a basic position wherein the support portion is adjacent to an inner side of the front wall, and an extended position wherein the support portion is remote from the front wall;

a linkage linking the support portion or the neck rest rods and the front wall, respectively;

a spring arrangement biasing the linkage or the housing, respectively, towards the extended position;

a releasable locking element adapted to lock the housing or the linkage, respectively, in the basic position, a releasing element which upon actuation is adapted to release the locking element thereby moving the housing from the basic position to the extended position;

a releasable strut element adapted to form an abutment for the housing and the linkage in the extended position, wherein the linkage comprises a pivoting lever and a strut lever, said pivoting lever and strut lever linked to each other between their upper and lower ends, the pivoting lever is linked to the support portion or the neck rest rods, respectively, with its upper end and linked to the housing with its lower end, the strut lever with its upper end supports the housing vertically and its lower end is supported on a supporting surface when the housing is in the extended position; and said pivoting lever is directly, pivotally coupled to the strut lever at a pivot point located between the upper and lower ends of each of said pivoting and strut levers.

19. The neck rest of claim 18, wherein the upper end of the strut lever has a guide rod which cooperates with an elongated hole in an interior of the housing, and wherein a plurality of saw teeth in the elongated hole and a plurality of support steps are arranged relative to each other such that the strut lever engages one support step when the guide rod is in a space between adjacent saw teeth.

* * * * *